(12) United States Patent
Bade

(10) Patent No.: US 9,807,124 B2
(45) Date of Patent: Oct. 31, 2017

(54) LAWFUL INTERCEPT PROVISIONING SYSTEM AND METHOD FOR A NETWORK DOMAIN

(71) Applicant: Level 3 Communications, LLC, Broomfield, CO (US)

(72) Inventor: Kenneth C. Bade, Ozark, MO (US)

(73) Assignee: Level 3 Communications, LLC, Broomfield, CO (US)

( * ) Notice: Subject to any disclaimer, the term of this patent is extended or adjusted under 35 U.S.C. 154(b) by 192 days.

(21) Appl. No.: 14/847,983

(22) Filed: Sep. 8, 2015

(65) Prior Publication Data

US 2016/0072851 A1    Mar. 10, 2016

Related U.S. Application Data

(60) Provisional application No. 62/047,339, filed on Sep. 8, 2014.

(51) Int. Cl.
*G06F 15/16* (2006.01)
*H04L 29/06* (2006.01)
*H04L 12/24* (2006.01)
*H04L 29/08* (2006.01)
*H04L 12/26* (2006.01)

(52) U.S. Cl.
CPC ........ *H04L 63/306* (2013.01); *H04L 41/0806* (2013.01); *H04L 65/1069* (2013.01); *H04L 67/34* (2013.01); *H04L 43/12* (2013.01); *H04L 63/164* (2013.01); *H04L 67/20* (2013.01)

(58) Field of Classification Search
USPC ....... 709/217, 223, 224, 226, 203, 206, 219, 709/225, 228, 231, 232, 238; 1/1
See application file for complete search history.

(56) References Cited

U.S. PATENT DOCUMENTS

| 7,254,645 B2 * | 8/2007 | Nishi ...................... H04L 12/46 709/223 |
| 7,356,560 B2 * | 4/2008 | Calinov .................. G06F 21/41 709/217 |
| 7,451,476 B1 | 11/2008 | Banks et al. |

(Continued)

FOREIGN PATENT DOCUMENTS

EP    1111892 B1    10/2007

OTHER PUBLICATIONS

International Preliminary Report on Patentability, dated Mar. 14, 2017, Int'l Appl. No. PCT/US15/048988, Int'l dated Sep. 8, 2015; 9 pgs.

(Continued)

*Primary Examiner* — Quang N Nguyen

(57) ABSTRACT

A network provisioning system includes a computer-based set of instructions that receive, from a third party network provisioning system managed by a third party service provider, provisioning information associated with a wiretap to be setup on a customer communication device. The instructions then transmit the provisioning information to a policy server in a network domain. Thereafter, when the media gateway transmits a policy request message to the policy server to establish a call session for the customer communication device, the policy server issues instructions to establish the wiretap in the media gateway.

18 Claims, 5 Drawing Sheets

(56) References Cited

U.S. PATENT DOCUMENTS

| | | | | |
|---|---|---|---|---|
| 8,214,533 B2* | 7/2012 | Nishi | ............ | H04L 12/46 |
| | | | | 709/226 |
| 8,654,760 B2* | 2/2014 | Rosenberg | ............ | H04L 65/1016 |
| | | | | 709/225 |
| 9,516,487 B2* | 12/2016 | Powell | ............ | H04W 4/24 |
| 9,557,889 B2* | 1/2017 | Raleigh | ............ | G06F 3/0482 |
| 2002/0143911 A1* | 10/2002 | Vicente | ............ | H04L 29/06 |
| | | | | 709/224 |
| 2003/0225871 A1* | 12/2003 | Calinov | ............ | G06F 21/41 |
| | | | | 709/223 |
| 2004/0255126 A1 | 12/2004 | Reith | | |
| 2007/0143858 A1 | 6/2007 | Hearty | | |
| 2015/0081837 A1* | 3/2015 | Bernier | ............ | H04W 8/24 |
| | | | | 709/217 |
| 2015/0140960 A1* | 5/2015 | Powell | ............ | H04W 4/24 |
| | | | | 455/406 |
| 2016/0328550 A1* | 11/2016 | Pritchard | ............ | G06F 21/34 |

OTHER PUBLICATIONS

International Search Report dated Dec. 7, 2015, Int'l Appl. No. PCT/US15/048988, Int'l dated Sep. 8, 2015; 3 pgs.
Written Opinion of the International Searching Authority dated Dec. 7, 2015, Int'l Appl. No. PCT/US15/048988, Int'l dated Sep. 8, 2015; 7 pgs.

\* cited by examiner

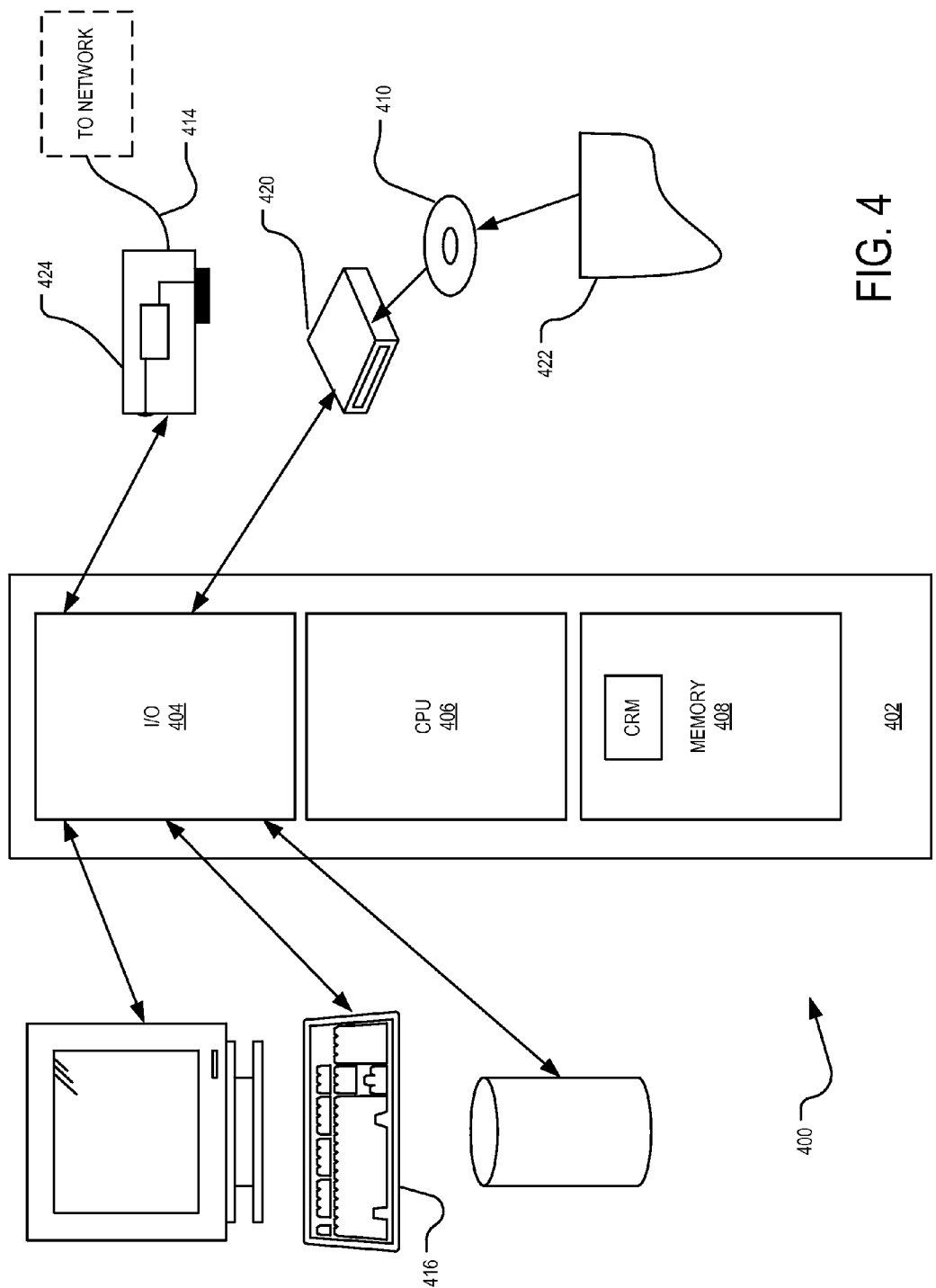

LAWFUL INTERCEPT PROVISIONING SYSTEM AND METHOD FOR A NETWORK DOMAIN

RELATED APPLICATIONS

This application claims priority under 35 U.S.C. §119 to U.S. Patent Application No. 62/047,339 titled "Lawful Intercept Provisioning System and Method For a Communication Network," which was filed on Sep. 8, 2014. The contents of 62/047,339 are hereby incorporated by reference in their entirety.

TECHNICAL FIELD

Aspects of the present disclosure relate to network domains and, in particular, to a lawful intercept provisioning system and method for a network domain.

BACKGROUND

In 1994, the Communications Assistance for Law Enforcement Act (CALEA) was passed to enhance the ability of law enforcement agencies to conduct electronic surveillance by requiring that telecommunications carriers and manufacturers of telecommunications equipment include surveillance capabilities in their equipment, facilities, and/or services. The original reason for adopting CALEA was that the Federal Bureau of Investigation (FBI) worried that the increasing use of digital telephone exchange switches would make wiretapping phones difficult to accomplish. CALEA was passed into law on Oct. 25, 1994 and came into force on Jan. 1, 1995.

SUMMARY

According to one embodiment of the present disclosure, a network provisioning system includes a computer-based set of instructions that receive, from a third party network provisioning system managed by a third party service provider, provisioning information associated with a wiretap to be setup on a customer communication device. The instructions then transmit the provisioning information to a policy server in a network domain. Thereafter, when the media gateway transmits a policy request message to the policy server to establish a call session for the customer communication device, the policy server issues instructions to establish the wiretap in the media gateway.

BRIEF DESCRIPTION OF THE DRAWINGS

The foregoing and other objects, features and advantages of the disclosure will be apparent from the following description of particular embodiments of the disclosure, as illustrated in the accompanying drawings in which like reference characters refer to the same components throughout the different views. The drawings are not necessarily to scale, emphasis instead being placed upon illustrating the principles of the disclosure.

FIG. 4 illustrates an example computer system according to one embodiment of the present disclosure.

DETAILED DESCRIPTION

Embodiments of the present disclosure provide a networking architecture and related apparatus and methods for provisioning wiretaps, such as lawful intercept (LI) wiretaps as specified by the Communications Assistance for Law Enforcement Act (CALEA), using a third party network provisioning service. Whereas today's packet-based communication services typically involve a combination of specialized services provided by multiple communication service providers, management of network domains used to provide secure services, such as wiretaps, has heretofore remained a challenging endeavor due to the level of coordination required for management of these secure services among multiple providers. Embodiments of the present disclosure provide a network domain architecture that allows third party (communication service providers) CSPs to provision secure network services, such as wiretaps, for a primary CSP in a secure manner by restricting the administration of secure services to certain controlled points of access within the domain of the primary CSP.

Figure 1A:
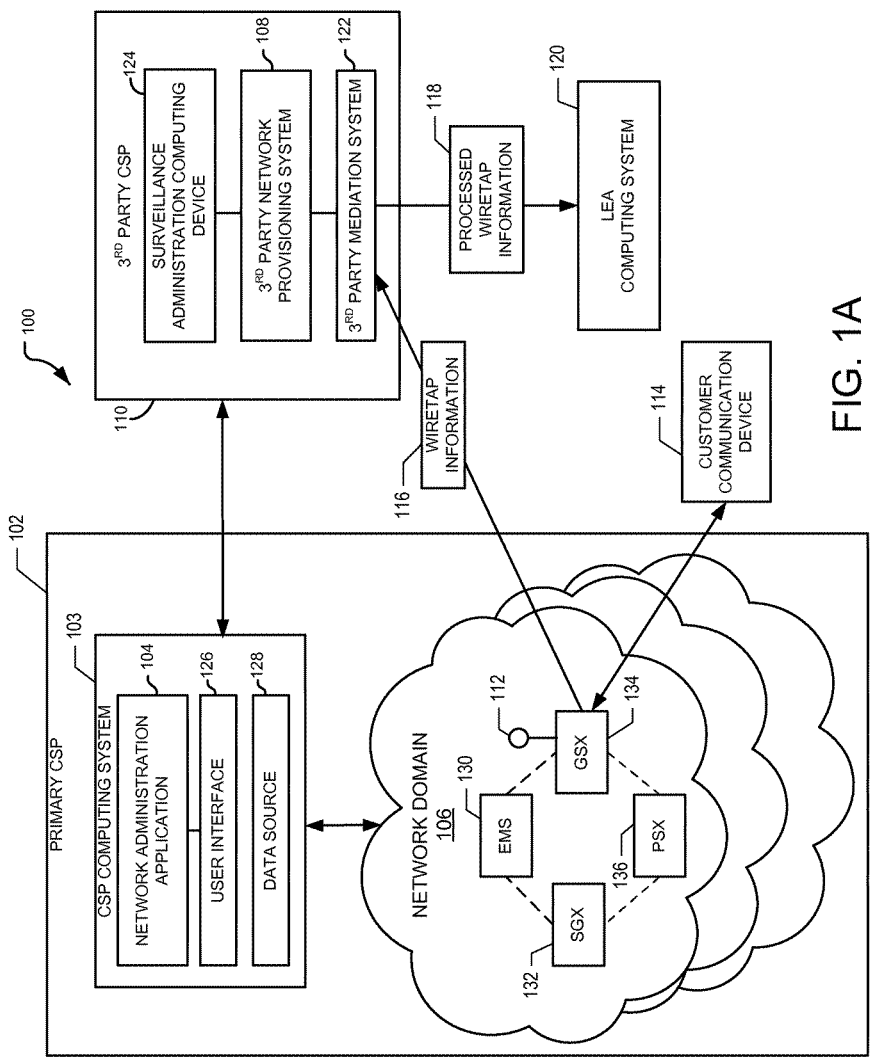
FIG. 1A is a block diagram of an example network domain that implements a wiretap provisioning system according to one aspect of the present disclosure.

FIG. 1A illustrates an example network domain architecture 100 according to one embodiment of the present disclosure. The network domain architecture 100 includes a primary CSP 102 having a CSP computing device 103 that executes a network administration application 104 for administering communication services provided by one or more network domains 106 of the primary CSP 102. As will be described in detail below, the network administration application 104 communicates with a third party network provisioning system 108 of a third party CSP 110 in a manner that allows the third party network provisioning system 108 to provision wiretaps 112 on one or more customer communication devices 114 that can provide wiretap content data and wiretap metadata to a law enforcement agency (LEA) computing system 120.

Although the present disclosure describes the implementation of wiretaps by a third party CSP, other embodiments contemplate that the teachings of the present disclosure may be directed to any secure provisioning service that may be provided by a third party CSP for a primary CSP, such as management of secure virtual private networks (VPNs) whose routing and network usage information are to remain secured from open discovery and inspection by users outside of a primary domain in which they are configured.

Currently provided packet-based communication services often involve a combination of services provided by multiple communication service providers. From a business perspective, it is often advantageous for certain communication service providers to outsource certain communication services to other providers that have particular expertise in certain areas. Nevertheless, this combination of service providers has yielded a platform that has been generally difficult to manage, and in particular, those communication services that require some level of security, such as wiretaps. For example, while it may be beneficial to outsource provisioning services for a packet-based network domain to a third party CSP, proprietary information associated with such secure services cannot be intrinsically controlled using traditional network architectures involving multiple CSPs. Embodiments of the present disclosure provide a solution to this problem, among other problems, by allowing a third party CSP to provision wiretaps 112 in the network domain 106, while restricting access of the third party CSP 110 to certain limited details associated with the wiretaps 112.

The third party CSP 110 generally includes a third party network provisioning system 108 and a third party mediation system 122. The third party network provisioning system 108 functions under control of a surveillance administration computing device 124 to provision wiretaps 112 in the network domains 106 of the primary CSP 102. The surveillance administration computing device 124 is authorized to provision wiretaps 112, but is restricted from the provisioning of general communication services in the network domains 106. Furthermore, the surveillance administration computing device 124 is restricted to only provisioning wiretaps 112 under direction from a user interface 126 managed by the primary CSP 102, the functionality of which will be described in detail below.

The third party mediation system 122 processes wiretap information 116, such as wiretap content data and wiretap metadata, and generates processed wiretap information 118, such as wiretap content data and processed wiretap metadata, that may be transmitted to the LEA computing system 120. For example, the third party mediation system 122 may generate a normalized timestamp information to be included with the wiretap information to handle various network elements from various network domains 106 that are driven by clocks that may not be synchronized with one another. Additionally, the third party mediation system 122 may include wiretap provisioning information, such as any special wiretap requirements to be applied to the wiretap, with the wiretap information transmitted to the LEA computing system 120.

The third party network provisioning system 108, third party mediation system 122, and surveillance administration computing device 124 each include one or more memory units for storing instructions that are executed by one or more processing units to provide at least the functionality described herein.

The primary CSP 102 may operate multiple domains to provide communication services to their customers. Although management of communication services may appear to be easier using a single domain, this configuration is not feasible when operating a large network. For example, operation of communication networks that cross international boundaries may be difficult to implement given the differing regulations that are required to be applied in each jurisdiction. Moreover, communication domains operating in one particular region may be constrained to providing different levels of service from what is normally provided when handling communication services from other regional boundaries in which foreign domains impose regulations and/or restrictions not required in their native domain. Accordingly, segregating communication services according to each national boundary provides an efficient manner of managing communication networks. Additionally, subscribers often have communication needs that differ from one another. Whereas some subscribers expect communication services at cost effective prices, other subscribers demand a relatively high level of service. As such, wiretaps 112 should be administered for the specific domain used by each customer communication device 114.

Each network domain 106 may be any type that provides communication services using one or more network elements. Moreover, each network domain 106 includes any type of data network having multiple communication nodes (communication nodes) for conveying communication services (e.g., routes, paths, etc.) through its respective domain. For example, the network domain 106 may be an Internet Protocol (IP) based communication network, such as a 'tier 1' communication network that provides varying types of communication services (e.g., voice, data, and/or video communication services, etc.). The network domain 106 provides multiple communication services for users using one or more network elements, such as an element management system (EMS) 130, a signaling gateway (SGX) 132, a media gateway (GSX) 134, and a policy server (PSX) 136 each having various purposes and responsibilities in its respective network domain 106.

For example, the EMS 130 functions as an intermediary between the network administration application 104 and the other network elements for receiving instructions from the network administration application 104 and issuing certain instructions to each of the other network elements to control the other network elements according to the received instructions. In one embodiment, the network administration application 104 may communicate with the EMS 130 of each network domain 106 for provisioning wiretaps 112. In general, each EMS 130 may be dedicated to managing the operation of its respective network domain 106 in which each network domain includes a certain subset of NEs that provide varying levels of service and/or one or more types of services in one or more specified geographical regions. In a particular embodiment, the EMS 130 may comprise a SONUS™ element management system, available from Sonus Global Services, Incorporated, which is headquartered in Westford, Mass.

The GSX 134 functions as a media gateway for selectively coupling the customer communication device 114 to other devices, through a data network, which may include the Internet. The SGX 132 provides signaling services for establishing and tearing down communication sessions (e.g., phone call sessions) between the customer communication device 114 and other remotely configured customer communication devices through its respective network domain 106. For example, the SGX 132 may provide signaling services from another communication network, such as a public switched telephone network (PSTN), using a suitable protocol, such as a signaling system number 7 (SS7) protocol to establish a communication session between the customer communication device 114 and another customer communication device on the PSTN. Additionally, the PSX 136 administers various policies to be adhered to by each of the other network elements. For example, when establishing a communication session, the SGX 132 may issue a request to the PSX 136 for policies to be associated with the customer communication device 114 for determining how the communication session is to be established.

In general, the application 104 allows the third party network provisioning system 108 to provision the wiretap 112. A wiretap 112 is typically established in response to a request from a LEA, such as via verbal communication or through a court order. Then, in response, a user of the architecture 100 contacts the third party CSP 110 to request wiretap provisioning information for establishing the wiretap 112 on the customer communication device 114. The user may manually contact (e.g., a phone call, an e-mail message, etc.) the third party CSP 110, or the contact may be made by the application 104 in which the user enters wiretap information (e.g., the phone number to be tapped, a time window under which the wiretap is to be used, name of the target associated with the phone number, etc.) through the user interface 126, and thereby in one specific example the system receives the wiretap information. It is possible that this information may also be received from a file, file transfer protocol (FTP), accessing a database or other application, or other mechanism. The third party network provisioning system 108 then generates provisioning information to be used for establishing the wiretap 112 and transmits the generated provisioning information back to the application 104. The application 104 then stores this information in a data source 128 as wiretap provisioning information 140, and forwards the wiretap provisioning information to the PSX 136, which provisions the wiretap 112 when a call session is set up for the customer communication device 114.

The wiretap 112 may be provisioned in any suitable manner. In one embodiment, the application 104 communicates with the EMS 130 to request a wiretap 112. Upon receipt of the request, the EMS 130 issues one or more instructions to the PSX 136 to update its policies with the wiretap information. Thereafter, when a communication session is requested by the GSX 134 for the customer communication device 114, it will transmit a policy request message to the PSX 136 to obtain policy information for the customer communication device 114 and use the obtained policy information to issue appropriate instructions to the GSX 134 for setting up the wiretap 112 in the GSX 134.

The network elements may communicate with one another in any suitable manner, such as using wireless, wired, and/or optical communications. In one embodiment, the network elements communicate with one another using a communication network, such as the Internet, an intranet, or another wired and/or wireless communication network. In another embodiment, the network elements communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the network elements may communicate with one another without the use of a separate and a distinct network.

The customer communication device 114 may be any type that is configured to communicate with the network domain 106 using protocols established for the network domain. For a network domain such as an Internet protocol (IP) based network domain, the customer communication device 114 communicates with other customer communication devices by transmitting and receiving IP based packets that are routed through the network domain 106. The customer communication device 114 has one or more processors and executable instructions stored in volatile and/or non-volatile memory for performing the actions and/or steps described herein.

Figure 1B:
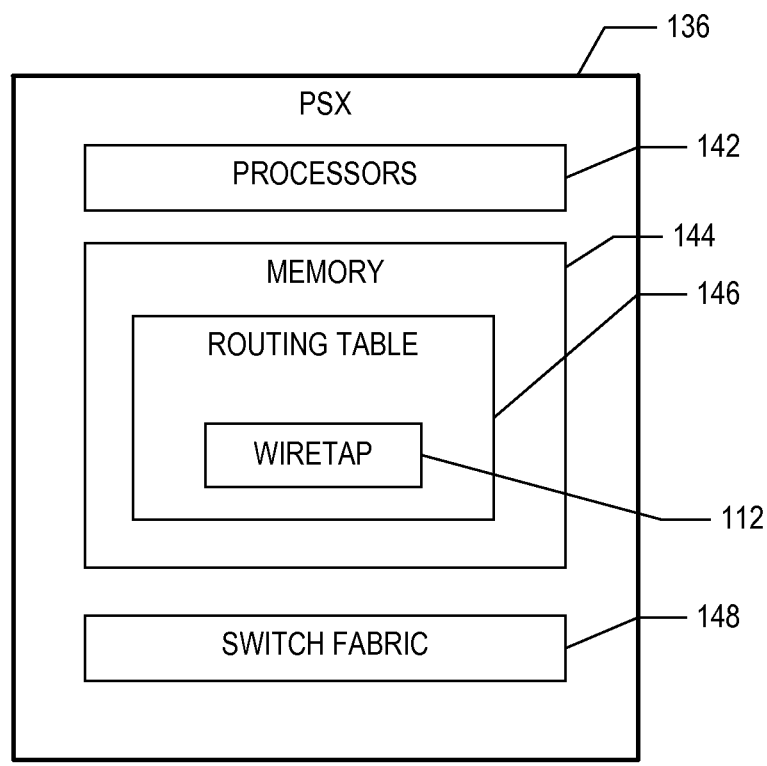
FIG. 1B illustrates an example gateway device on which a wiretap may be configured according to one aspect of the present disclosure.

FIG. 1B illustrates an example PSX 136 according to one aspect of the present disclosure. The PSX 136 includes a computing or processing device that includes one or more processors 142 and memory (e.g., a non-transitory computer-readable medium) 144 and is to receive data and/or communications from, and/or transmit data and/or communications to, the CSP computing device 103 via wireless, wired, and/or optical communications.

The memory stores a routing table 146 for managing communication traffic through the PSX 136. The routing table 146 may also be provisioned to set-up a wiretap 112 within the PSX 136. In one embodiment, the wiretap 112 comprises a conference connection established with a communication service provided to customer communication device 114 of a target. The conference connection includes entries in the routing table 146 for communicatively couples the customer communication device 114 to another customer communication device via the routing table. The conference connection also includes an additional leg that functions in simplex mode to transmit the wiretap information 116 (e.g., wiretap content data and wiretap metadata) to the third party mediation system 122. Thus, the communication service provided to the customer communication device 114 may continue unimpeded while a copy of the service (e.g., the wiretap information) is transmitted to the third party mediation system 122, which may then be processed and forwarded to the LEA communication system 120 for inspection by the LEA. The wiretap content data generally includes data generated during a communication session of the customer communication device 114 used by the target. Examples of such data includes, but is not limited to data streams (e.g., voice and/or video data generated during one or more call sessions), and/or metadata associated with one or more call sessions. The wiretap metadata generally includes context information associated with its corresponding wiretap content data. For example, the wiretap metadata may include information associated with the called and calling parties, the time and length of the communication session, terms of service (ToS) associated with the communication session, and the like.

Figure 1C:
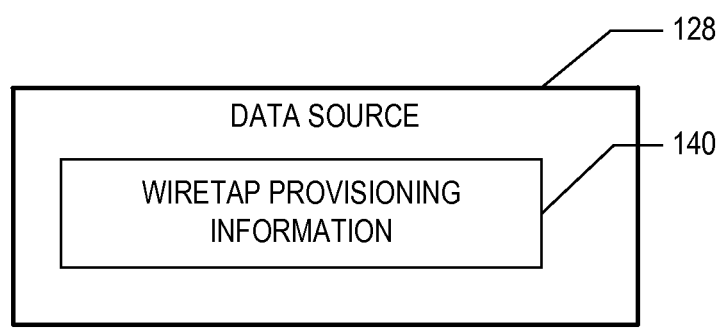
FIG. 1C illustrates an example data source according to one aspect of the present disclosure.

As shown in FIG. 1C, the data source 128 stores wiretap information 140 associated with wiretap requests received from the user interface 126. For example, the wiretap information 140 may include information inputted in response to a court order from a LEA. The wiretap information 140 includes any type that can be compared with wiretap provisioning information received from the third party network provisioning system 120, such as a phone number to be tapped, a time window under which the wiretap is to be used (e.g., March $28^{th}$ to September $1^{st}$), name of the target, and the like. Although the data source 128 is shown as being located on, at, or within the CSP computing device 103, it is contemplated that the data source 128 can be located remotely from the CSP computing device 103, such as on, at, or within the memory 146 of one or more network elements. For example, the wiretap information 140 may be stored in a remote server that is owned and maintained by the LEA.

Figure 2:
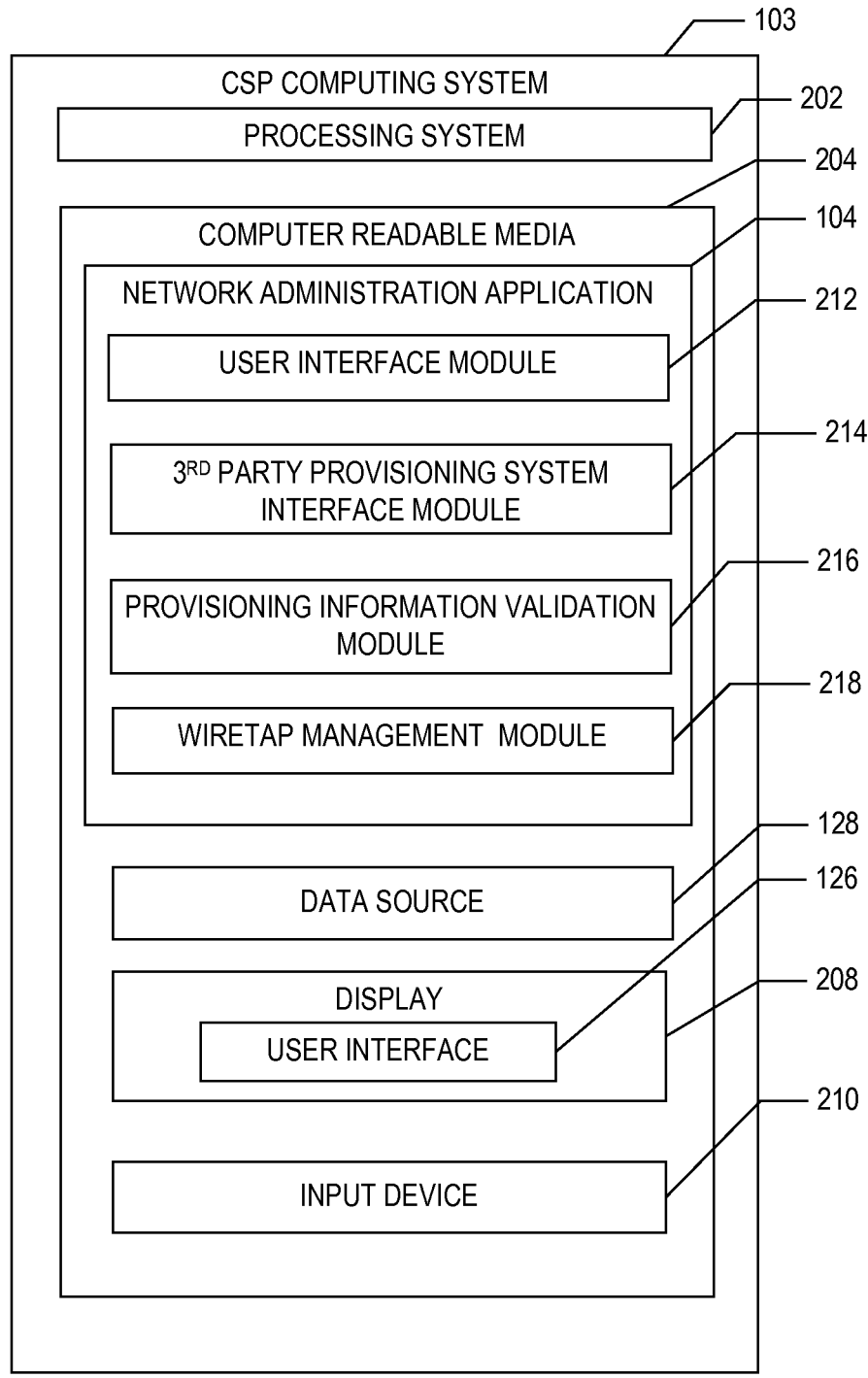
FIG. 2 illustrates a diagram of an example communication service provider (CSP) computing device according to one aspect of the present disclosure.

FIG. 2 is a block diagram depicting an example network administration application 104 executed on the CSP computing device 103. According to one aspect, the CSP computing device 103 includes a processing system 202 that includes one or more processors or other processing devices. A processor is hardware. Examples of such a computing device include one or more servers, personal computers, mobile computers and/or other mobile devices, and other computing devices. The CSP computing device 103 may communicate with the EMS 130 and/or the third party network provisioning system 108 via wireless, wired, and/or optical communications.

According to one aspect, the CSP computing device 103 includes a computer readable media 204 on which the network administration application 104 and data source 128 are stored. The network administration application 104 includes instructions or modules that are executable by the processing system 202 to perform the features of the network provisioning architecture 100 described herein.

The computer readable media 204 may include volatile media, nonvolatile media, removable media, non-removable media, and/or another available media that can be accessed by the CSP computing device 103. By way of example and not limitation, computer readable media 204 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

According to one aspect, the CSP computing device 103 may include a user interface 126 displayed on a display 208, such as a computer monitor, for displaying data. The computing device 103 may also include an input device 210, such as a keyboard or a pointing device (e.g., a mouse, trackball, pen, or touch screen) to enter data into or interact with the user interface 126. According to one aspect, the network administration application 104 includes instructions or modules that are executable by the processing system 202 as will be described in detail herein below.

A user interface module 212 facilitates the receipt of input data and/or output data from or to a user interface, such as the user interface 126 or a user interface provided by a separate computing device for managing wiretaps 112 in the network domain 106. For example, the user interface module 212 may receive a request to generate a wiretap, and transmit the results of the request back to the user interface 126. As another example, the user interface module 212 may manage multiple type of requests (e.g., retrieve a list of all wiretaps in the network, update the wiretaps 112 in the network with wiretap information 140 stored in the data source 128, and/or delete all or a selected list of wiretaps from the network) using the user interface 126.

A third party network provisioning system interface module 214 communicates with the third party network provisioning system 108. In one embodiment, the third party network provisioning system interface module 214 may expose an application program interface (API) that is available to the third party network provisioning system 108 via a public network domain, such as the Internet. In another embodiment, the API may provide a secure communication session with the third party network provisioning system 108 using an Internet protocol security (IPsec) tunnel.

A wiretap provisioning information validation module 216 validates wiretap provisioning information received from the third party network provisioning system 108 and forwards the wiretap provisioning information that has been properly validated while rejecting invalid wiretap provisioning information. In one embodiment, the wiretap provisioning information validation module 216 compares the stored wiretap provisioning information received from the user interface 128 with the wiretap provisioning information received from the third party network provisioning system 108 to determine whether the received wiretap provisioning information is valid. In another embodiment, the wiretap provisioning information validation module 216 may generate a passcode that is transmitted along with a request to the third party network provisioning system 108 such that, when the wiretap provisioning information is received, the passcode included in the wiretap provisioning information may be compared with the generated passcode to ensure that the received wiretap provisioning information is valid.

A wiretap management module 218 manages the generation and/or deletion of wiretaps in the network domain 106 according to wiretap information received from the wiretap provisioning information validation module 216. In one embodiment, the wiretap management module 218 forwards or otherwise transmits the validated wiretap provisioning information to the PSX 136 for establishing a wiretap 112 and/or other instructions for removing a previously established wiretap 112 in the PSX 136. In another embodiment, the wiretap management module 218 is restricted to provisioning only those wiretaps using wiretap information received from the provisioning information validation module 216. In this manner, the wiretap management module 218 may reduce or inhibit illicit manipulation of wiretaps 112 in some embodiments.

It should be appreciated that the modules described herein are provided only as an example of a computing device that may execute the network administration application 104 according to the teachings of the present invention, and that other computing devices may have the same modules, different modules, additional modules, or fewer modules than those described herein. For example, one or more modules as described in FIG. 2 may be combined into a single module. As another example, certain modules described herein may be encoded and executed on other computing devices, such as the network element used by the user.

Figure 3:
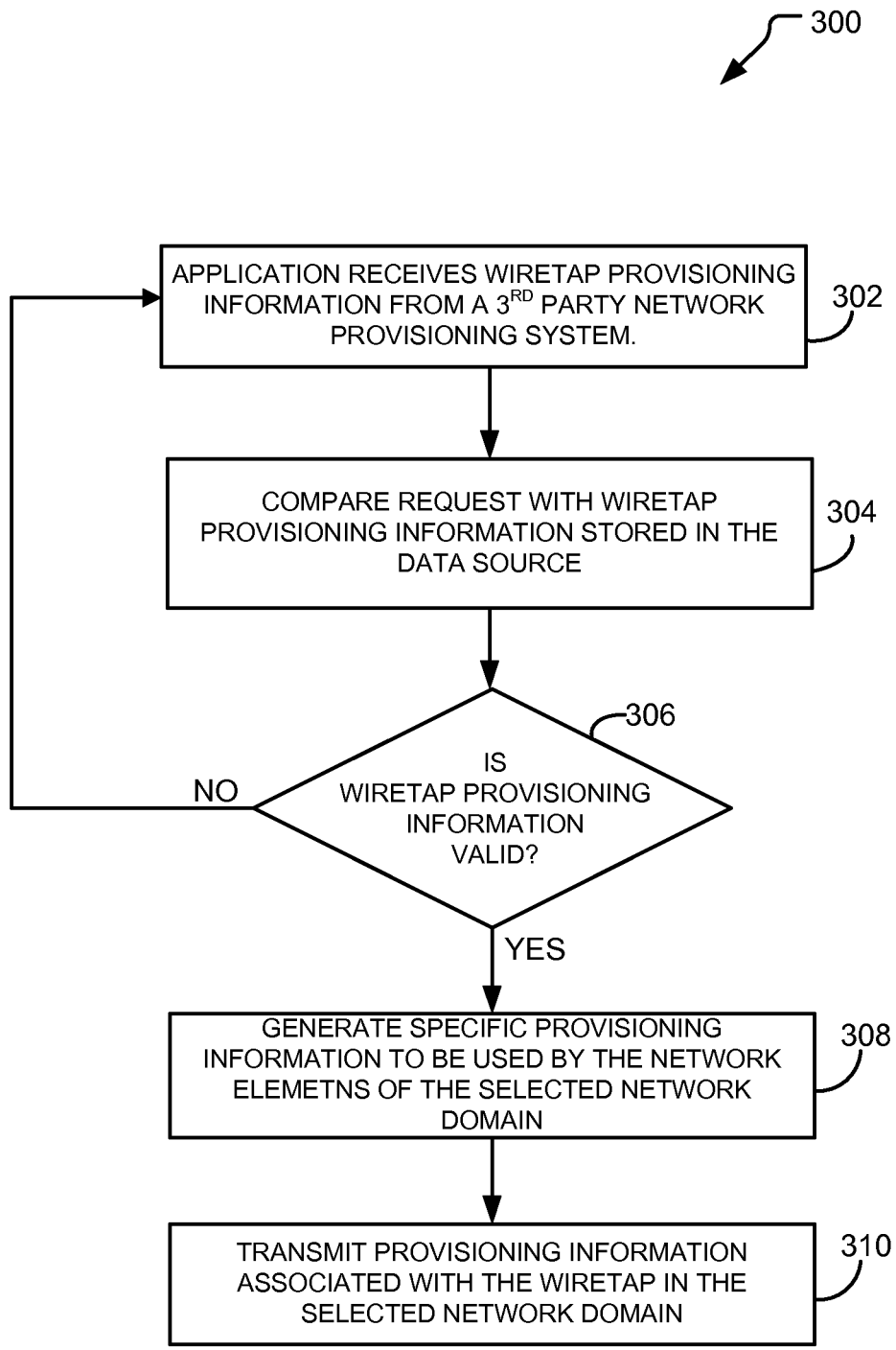
FIG. 3 illustrates an example process that may be performed by the wiretap provisioning system according to one aspect of the present disclosure.

FIG. 3 illustrates an example process 300 that may be performed by the network administration application 104 according to the teachings of the present disclosure. In step 302, the network administration application 104 receives a provisioning request for manipulating (e.g., establishing, updating, or deleting) a wiretap from the third party network provisioning system 108. The provisioning request may include information for manipulating a single wiretap associate with one customer communication device, or it may include information for manipulating multiple wiretaps associated with a corresponding multiple number of customer communication devices.

In one embodiment, the wiretap provisioning information may include information associated with a particular network domain 106 that is to handle the wiretap 112. For example, in some cases, it may be beneficial to establish wiretaps from certain network domains according to the geographical location of the customer communication device 114. Accordingly, the network domain information included in the wiretap provisioning request allows a specific network domain 106 be identified for establishing the wiretap 112 therein. In one example, the network administration application 104 may expose an API that is accessible by the third party network provisioning system 108 via a publicly accessible network, such as the Internet. Additionally, the network administration application 104 may establish a secure connection with the third party network provisioning system using an IPsec tunnel.

In step 304, the network administration application 104 compares the received request with the associated wiretap provisioning information 140 stored in the data source 128. For example, the application 104, which has received user input, via the user interface 126, for establishing a wiretap 112 on a particular customer communication device 114, may store information associated with that request in the data source 140 as wiretap provisioning information 140, and forward the request to the third party network provisioning system 108. Thus, when the third party network provisioning system 108 generates the actual provisioning information for that wiretap 112, the application may compare the provisioning information received from the third party network provisioning system 108 with the wiretap provisioning information received from the user interface 126, and determine that the wiretap provisioning information is valid if they match. Such behavior may be useful for inhibiting or reducing the likelihood that illicit wiretaps may be provisioned or unprovisioned by the third party network provisioning system 108 or some other external system. In one embodiment, the application 104 may generate an error message, such as an alarm message, that is transmitted to the user interface 126 for notifying a user of the application 104 that an illicit or improper wiretap operation was attempted and thwarted. Nevertheless, at step 306, when the application 104 determines that the wiretap provisioning information is valid, processing continues as step 308; otherwise, the received wiretap provisioning information is discarded and processing continues at step 302 to receive another request for provisioning.

At step 308, the application 104 generates specific wiretap provisioning information to be used by the network elements of the selected network domain 106. For example, the application 104 may generate specific provisioning information according to a type of provisioning action is to be used as well as which network domain 106 is to be used for provisioning the wiretap 112. Thereafter, the application 104 transmits the specific provisioning information to the EMS 130 of the selected network domain 106 in step 310. Once the EMS 130 receives the provisioning information, it may then forward the provisioning information to the PSX 136 for establishing the wiretap 112.

It should be appreciated that the process described herein is provided only as an example and that the network provisioning architecture 100 may execute additional steps, fewer steps, or differing steps than those described herein. For example, the steps 302 through 310 may be executed in any suitable order; that is, the steps as described in FIG. 3 are not limited to execution in any particular sequence. As another example, either of the steps 302 through 310 described herein may be executed by the CSP computing device 103 or may alternatively be performed by another computing device without departing from the spirit or scope of the present disclosure.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., compact disk-read-only memory (CD-ROM)); magneto-optical storage medium, read only memory (ROM); random access memory (RAM); erasable programmable memory (e.g., erasable programmable read-only memory (EPROM) and electrically erasable read-only memory (EEPROM)); flash memory; or other types of medium suitable for storing electronic instructions.

FIG. 4 illustrates an example computing system 400 that may implement various systems, such as the application 104, and methods discussed herein, such as process 300. A general purpose computer system 400 is capable of executing a computer program product to execute a computer process. Data and program files may be input to the computer system 400, which reads the files and executes the programs therein such as the application 104. Some of the elements of a general purpose computer system 400 are shown in FIG. 4 wherein a processing system 402 is shown having an input/output (I/O) section 404, a hardware central processing unit (CPU) 406, and a memory section 408. The processing system 402 of the computer system 400 may have a single hardware central-processing unit 406 or a plurality of hardware processing units. The computer system 400 may be a conventional computer, a server, a distributed computer, or any other type of computing device, such as one or more external computers made available via a cloud computing architecture. The presently described technology is optionally implemented in software devices loaded in memory 408, stored on a configured DVD/CD-ROM 410 or storage unit 412, and/or communicated via a wired or wireless network link 414, thereby transforming the computer system 400 in FIG. 4 to a special purpose machine for implementing the described operations.

The memory section 408 may be volatile media, nonvolatile media, removable media, non-removable media, and/or other hardware media or hardware mediums that can be accessed by a general purpose or special purpose computing device. For example, the memory section 408 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 404 is connected to one or more optional user-interface devices (e.g., a user interface such as a keyboard 416 or the user interface 512), an optional disc storage unit 412, an optional display 418, and an optional disc drive unit 420. Generally, the disc drive unit 420 is a DVD/CD-ROM drive unit capable of reading the DVD/CD-ROM medium 410, which typically contains programs and data 422. Computer program products containing mechanisms to effectuate the systems and methods in accordance with the presently described technology may reside in the memory section 408, on a disc storage unit 412, on the DVD/CD-ROM medium 410 of the computer system 400, or on external storage devices made available via a cloud computing architecture with such computer program products, including one or more database management products, web server products, application server products, and/or other additional software components. Alternatively, a disc drive unit 420 may be replaced or supplemented by a floppy drive unit, a tape drive unit, or other storage medium drive unit. An optional network adapter 424 is capable of connecting the computer system 400 to a network via the network link 414, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 400 is connected (by wired connection and/or wirelessly) to a local network through the network interface or adapter 424, which is one type of communications device. When used in a WAN-networking environment, the computer system 400 typically includes a modem, a network adapter, or any other type of communications device for establishing communications over the wide area network. In a networked environment, program modules depicted relative to the computer system 400 or portions thereof, may be stored in a remote memory storage device. It is appreciated that the network connections shown are examples of communications devices for and other means of establishing a communications link between the computers may be used.

Some or all of the operations described herein may be performed by the processing system 402, which is hardware. Further, local computing systems, remote data sources and/or services, and other associated logic represent firmware, hardware, and/or software configured to control operations the system 100 and/or other components. The system set forth in FIG. 4 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A network provisioning system comprising:
   a computing device comprising at least one processor and at least one tangible memory to store instructions that are executed by the at least one processor to:
   receive, from a third party network provisioning system managed by a service provider that is separate and distinct from another service provider that manages the computing device, provisioning information associated with a wiretap to be setup on a customer communication device; and
   transmit the provisioning information to a policy server in a network domain;
   wherein, in response to a media gateway in the network domain transmitting a policy request message to the policy server associated with the customer communication device to establish a call session, the policy server issues instructions to the media gateway to establish the wiretap, according to the provisioning information;
   wherein the instructions are further executed to:
   compare stored provisioning information with the provisioning information received from the third party network provisioning system, the stored provisioning information received through a user interface;
   validate the provisioning information received from the third party network provisioning system according to the comparison, wherein the validated provisioning information is transmitted to the policy server;
   generate a passcode; and
   transmit the passcode to the third party network provisioning system, wherein the provisioning information from the third party network provisioning system includes the passcode.

2. The network provisioning system of claim 1, wherein the provisioning information includes information associated with which one of a plurality of network domains is to provide communication service to the customer communication device.

3. The network provisioning system of claim 1, wherein the instructions are further executed to receive the provisioning information from the third party network provisioning system using an application program interface (API) that is exposed to a public communication network.

4. The network provisioning system of claim 3, wherein the API is accessed by the third party network provisioning system using an Internet protocol security (IPsec) tunnel.

5. The network provisioning system of claim 1, wherein the provisioning information is specified according to a Communications Assistance for Law Enforcement Act (CALEA).

6. The network provisioning system of claim 1, wherein the third party provisioning system comprises a third party mediation server that is executed to:
   receive wiretap information from the media gateway;
   process the wiretap information according to one or more criteria; and
   transmit the processed wiretap information to a law enforcement agency computing device.

7. The network provisioning system of claim 6, wherein the wiretap information comprises at least one of wiretap content data and wiretap metadata.

8. The network provisioning system of claim 6, wherein the one or more criteria comprises at least one of timestamp information, and information associated with the provisioning information.

9. A network provisioning method comprising:
   receiving, using instructions stored in at least one memory and executed by at least one processor, provisioning information associated with a wiretap to be setup on a customer communication device from a third party network provisioning system managed by a service provider that is separate and distinct from another service provider that manages a computing device comprising the at least one memory and the at least one processor:
   transmitting, using the instructions, the provisioning information to a policy server in a network domain; and
   in response to a media gateway in the network domain transmitting a policy request message to the policy server associated with the customer communication device to establish a call session, issuing, by the policy server, instructions to the media gateway to establish the wiretap, according to the provisioning information;
   wherein the instructions are further executed to:
      compare stored provisioning information with the provisioning information received from the third party network provisioning system, the stored provisioning information received through a user interface;
      validate the provisioning information received from the third party network provisioning system according to the comparison, wherein the validated provisioning information is transmitted to the policy server;
      generate a passcode; and
      transmit the passcode to the third party network provisioning system, wherein the provisioning information from the third party network provisioning system includes the passcode.

10. The network provisioning method of claim 9, wherein the provisioning information includes information associated with which one of a plurality of network domains is to provide communication service to the customer communication device.

11. The network provisioning method of claim 9, further comprising receiving the provisioning information from the third party network provisioning system using an application program interface (API) that is exposed to a public communication network.

12. The network provisioning method of claim 11, further comprising accessing the API by the third party network provisioning system using an Internet protocol security (IPsec) tunnel.

13. The network provisioning method of claim 9, wherein the provisioning information is specified according to a Communications Assistance for Law Enforcement Act (CALEA).

14. The network provisioning method of claim 9, further comprising:
   receiving wiretap information from the media gateway;
   processing the wiretap information according to one or more criteria; and
   transmitting the processed wiretap information to a law enforcement agency computing device.

15. The network provisioning method of claim 14, wherein the one or more criteria comprises at least one of timestamp information, and information associated with the provisioning information.

16. A non-transitory computer-readable medium encoded with instructions executable by a processor to:
   receive provisioning information associated with a wiretap to be setup on a customer communication device from a third party network provisioning system managed by a service provider that is separate and distinct from another service provider that manages a computing device comprising the processor:
   transmit the provisioning information to a policy server in a network domain; and
   in response to a media gateway in the network domain transmitting a policy request message to the policy server associated with the customer communication device to establish a call session, issue, by the policy server, instructions to the media gateway to establish the wiretap, according to the provisioning information;
   wherein the instructions are further executed to:
      compare stored provisioning information with the provisioning information received from the third party network provisioning system, the stored provisioning information received through a user interface;
      validate the provisioning information received from the third party network provisioning system according to the comparison, wherein the validated provisioning information is transmitted to the policy server;
      generate a passcode; and
      transmit the passcode to the third party network provisioning system, wherein the provisioning information from the third party network provisioning system includes the passcode.

17. The non-transitory computer-readable medium of claim 16, wherein the instructions are further executed to receive the provisioning information from the third party network provisioning system using an application program interface (API) that is exposed to a public communication network.

18. The non-transitory computer-readable medium of claim 16, wherein the third party network provisioning system comprises a third party mediation server that is executed to:
   receive wiretap information from the media gateway;
   process the wiretap information according to one or more criteria; and transmit the processed wiretap information to a law enforcement agency computing device.

\* \* \* \* \*